(12) United States Patent
Hidaka et al.

(10) Patent No.: US 7,948,358 B2
(45) Date of Patent: May 24, 2011

(54) VEHICLE ANTI-THEFT SYSTEM INCORPORATED WITH INTERNAL ANTENNAS

(75) Inventors: Osamu Hidaka, Miyazaki (JP);
Kimiharu Mishima, Miyazaki (JP);
Makoto Honkawa, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 1243 days.

(21) Appl. No.: 11/431,189

(22) Filed: May 9, 2006

(65) Prior Publication Data
US 2006/0290468 A1 Dec. 28, 2006

(30) Foreign Application Priority Data

Jun. 28, 2005 (JP) ................. 2005-187691

(51) Int. Cl.
*G05B 19/00* (2006.01)
*B60R 25/00* (2006.01)
(52) U.S. Cl. .............. 340/5.61; 340/5.72; 340/572.7
(58) Field of Classification Search .......... 340/5.61, 340/5.72, 572.7, 426.11–426.36; 307/10.5
See application file for complete search history.

(56) References Cited

U.S. PATENT DOCUMENTS

| 5,230,233 | A | 7/1993 | Shoji et al. | |
| 6,011,698 | A * | 1/2000 | Buehler | 361/799 |
| 6,188,140 | B1 * | 2/2001 | Kito et al. | 307/10.4 |
| 6,400,040 | B1 * | 6/2002 | Scudder et al. | 307/10.2 |
| 6,462,291 | B1 * | 10/2002 | Sachs | 200/302.2 |
| 6,933,831 | B2 * | 8/2005 | Ieda et al. | 340/5.72 |
| 6,953,619 | B2 * | 10/2005 | Dean et al. | 428/297.4 |
| 7,377,142 | B2 * | 5/2008 | Rajacic | 70/186 |
| 2002/0014097 | A1 * | 2/2002 | Vito | 70/202 |
| 2002/0024468 | A1 * | 2/2002 | Palmer et al. | 343/702 |
| 2006/0055517 | A1 * | 3/2006 | Ghabra et al. | 340/426.11 |

FOREIGN PATENT DOCUMENTS

| JP | 4-112155 U | 9/1992 |
| JP | 2002-115433 | 4/2002 |
| JP | 2004-217146 | 8/2004 |
| JP | 2005-045625 A | 2/2005 |

\* cited by examiner

*Primary Examiner* — Brian A Zimmerman
*Assistant Examiner* — Omer S Khan
(74) *Attorney, Agent, or Firm* — Carrier Blackman & Associates, P.C.; William D. Blackman; Joseph P. Carrier

(57) ABSTRACT

In a vehicle anti-theft system including an immobilizer system and a keyless entry system provided adjacent to a key cylinder, an immobilizer system antenna (5) is insert molded in an annular member (3) surrounding a key opening (2) of the key cylinder and a keyless entry system antenna (9) is incorporated in a housing (6, 7) which is integrally formed with the annular member. Thereby, the immobilizer system antenna and keyless entry system antenna can be accommodated in a common unit while suitably spacing them away from each other. Therefore, without requiring any special shielding arrangement, the two antennal can perform favorably while the overall size of the system can be minimized.

19 Claims, 3 Drawing Sheets

VEHICLE ANTI-THEFT SYSTEM INCORPORATED WITH INTERNAL ANTENNAS

TECHNICAL FIELD

The present invention relates to a vehicle anti-theft system that enables only an authorized vehicle operator to operate a vehicle by verifying a code emitted from an electronic key carried by the vehicle operator with an onboard verification unit via radio wave.

BACKGROUND OF THE INVENTION

Keyless entry systems that allow a door to be unlocked without using a mechanical key are in wide use, and such a system typically comprises an electronic key carried by a vehicle operator and configured to emit a radio wave signal containing a code signal, and an onboard verification unit that authenticates the code signal received from the electronic key (see Japanese patent laid open publication no. 2002-115433).

Immobilizer systems are also in wide use. An immobilizer system typically comprises a transponder incorporated in a mechanical key and an onboard verification unit that permits the starting of the engine when a prescribed response is returned from the transponder. Thereby, an illicit attempt to steal the vehicle by using a duplicate key or the like can be prevented.

Conventionally, each vehicle was fitted with two separate control systems to control such two systems. However, as use of such systems expands, there is a growing demand to combine the two systems into a single unit which is incorporated in a single housing so that the cost for the components parts may be reduced and the manufacturing efficiency may be improved.

However, because the two systems rely on the use of radio wave for their operation, when they are combined into a single housing, it becomes necessary to prevent any interferences between the antennas for the keyless entry system and immobilizer system.

BRIEF SUMMARY OF THE INVENTION

In view of such problems of the prior art, a primary object of the present invention is to provide a vehicle anti-theft system that combines a keyless entry system and an immobilizer system into a single housing while avoiding any undesirable interferences between antennas for the keyless entry system and immobilizer system.

A second object of the present invention is to provide a vehicle anti-theft system combining a keyless entry system and an immobilizer system that is highly compact and economical to manufacture.

According to the present invention, such objects can be accomplished by providing a vehicle anti-theft system including an immobilizer system and a keyless entry system provided adjacent to a key cylinder, comprising: an annular member mounted around a key opening of the key cylinder; a housing integrally connected to the annular member and retaining a printed circuit board for both the immobilizer system and keyless entry system; an immobilizer system antenna that may consist of a coil and is incorporated in the annular member; and a keyless entry system antenna provided in the housing.

Thereby, the immobilizer system antenna and keyless entry system antenna can be accommodated in a common unit while suitably spacing them away from each other. Therefore, without requiring any special shielding arrangement, the two antennas can perform favorably while the overall size of the system can be minimized.

According to a preferred embodiment of the present invention, the housing is mounted on the key cylinder and includes a bottom wall extending along a side of the key cylinder and a side wall extending perpendicularly from the bottom wall.

If the keyless entry system antenna includes a portion extending in parallel with the bottom wall and a portion extending in parallel with the side wall, it becomes possible to define a suitable directivity on the one hand, and maximize the length of the conductor of the antenna for the given size of the housing.

For securely mounting the antennas on the housing, the immobilizer system antenna may be insert molded in the annular member, and/or the keyless entry system antenna may be insert molded in the bottom wall of the housing. Also, the keyless entry system antenna may be mounted on the printed circuit board, preferably by soldering. If the housing consists of injection molded plastic material containing glass fibers, the glass fibers provide a favorable dielectric property for the keyless entry system. If the keyless entry system antenna is made of stamp formed sheet metal, it can be manufactured not only economically but also allows the insert molding process to be performed in a reliable manner.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
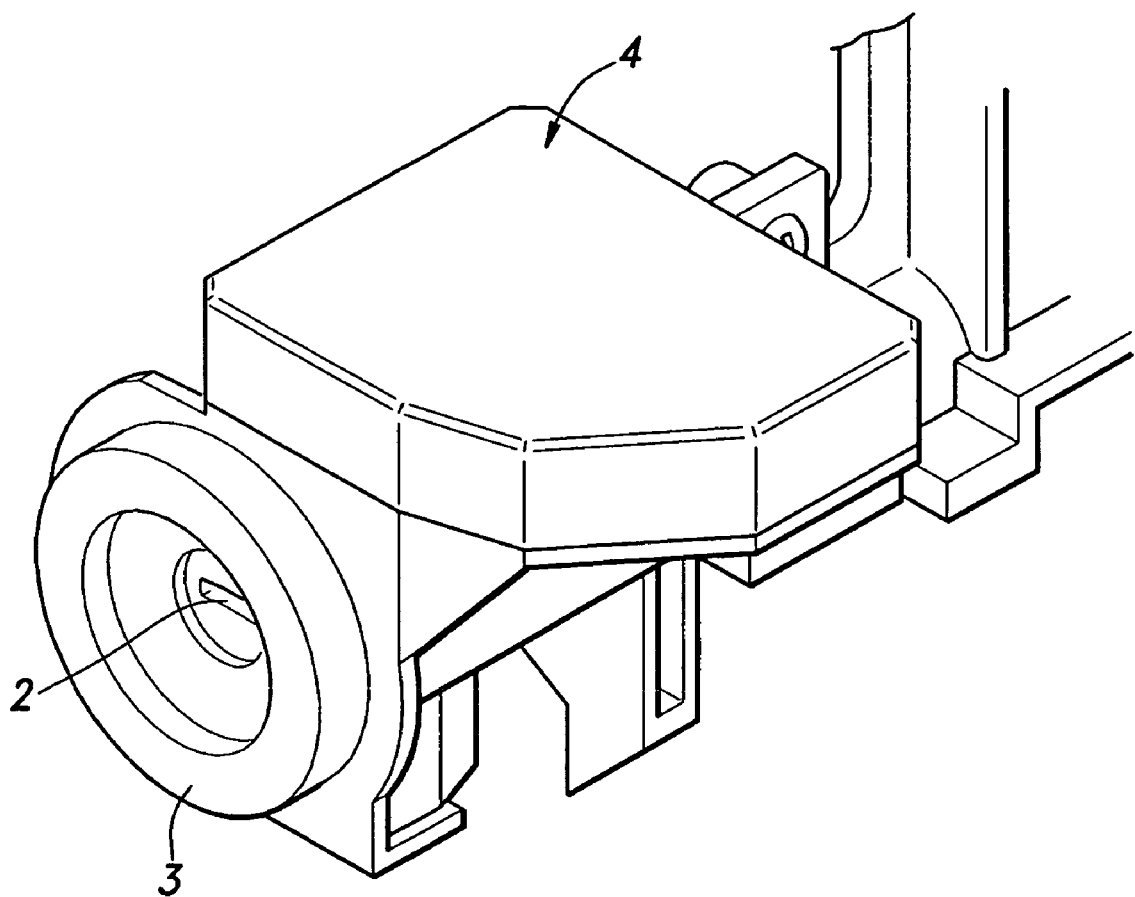
FIG. 1 is a fragmentary perspective view of a vehicle key device embodying the present invention.

FIG. 1 shows a key device 1 of a vehicle anti-theft system embodying the present invention. This key device 1 is configured to be attached to a steering column of a motor vehicle, and comprises a cylinder lock unit, a steering lock unit and a rotary switch unit. As well known in the art, the key device 1 is provided with the functions of switches for selectively supplying electric power for onboard equipment and a starter motor and a lock for securing a steering shaft for a security purpose.

More specifically, the key device 1 comprises an annular ornamental cover 3 that covers an outer end of a key cylinder defining a key opening 2 and a control unit 4 mounted on top of the key cylinder. The control unit 4 is incorporated with an immobilizer system that detects a code signal emitted from a knob of the key inserted in the key opening 2, verifies the code signal by using a code matching circuit and enables the engine to be started only when the authenticity of the key is successfully verified.

Figure 2:
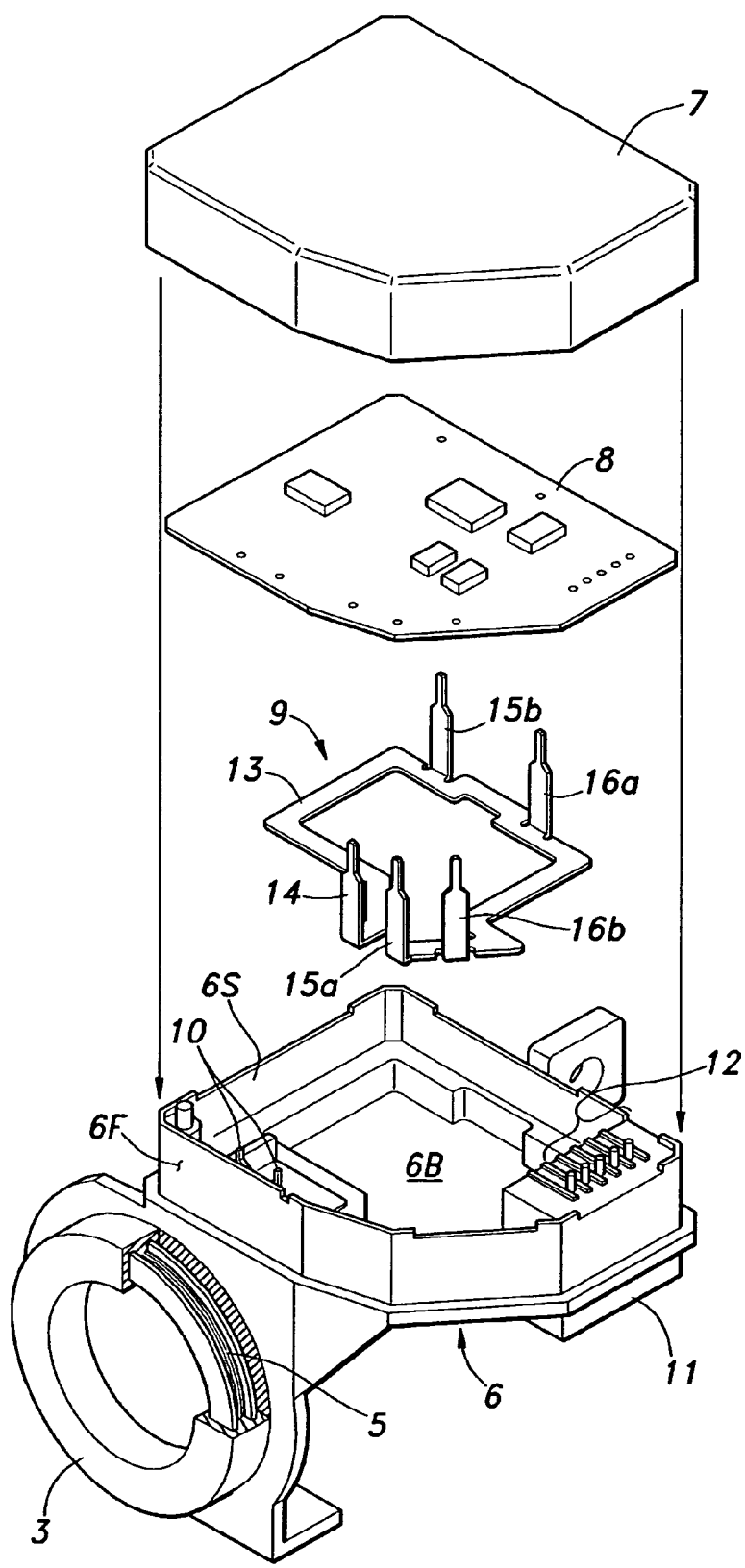
FIG. 2 is an exploded perspective view of a first embodiment of the present invention.

The ornamental cover 3 is annular in shape and concentrically surrounds the key opening 2. As shown in FIG. 2, in the ornamental cover 3 is insert molded a coil 5 that serves as an antenna for the immobilizer system.

The control unit 4 comprises an inner box 6 which is integrally molded with the ornamental cover 3, an outer box 7 which is fitted on the inner box 6 so as to jointly define a housing for the control unit 4, a printed circuit board 8 carrying IC chips and other components for the code verification circuit and other electronic circuitry received in the inner box 6 and a keyless entry system antenna 9 mounted underneath the printed circuit board 8. A pair of terminals 10 connected to the coil 5 and insert molded in the ornamental cover 3 with the coil 5 project upward from a bottom wall 6B of the inner box 6 in a front end portion thereof. A plurality of pins 12 for a connector 11 are provided on a right hand side of the inner box 6 as seen in FIG. 2 to enable electric connection with external circuits.

The keyless entry system antenna 9 consists of an inverted F antenna that comprises a loop portion 13 extending along a horizontal plane, a power feed pin 14 extending vertically from an end of the loop portion 13 and a short-circuit pin 15a extending vertically from the other end of the loop portion 13. The keyless entry system antenna 9 further comprises another short-circuit pin 15b and an open pin 16a that extend vertically upward in intermediate parts of the loop portion 13 in parallel with each other and another open pin 16b extending vertically upward from the loop portion 13 adjacent to the power feed pin 14. The keyless entry system antenna 9 is stamp formed from metallic sheet, and the loop portion 13 thereof is insert molded in the bottom wall 6B of the inner box 6.

The loop portion 13 of this keyless entry system antenna 9 provides a directivity which is in the shape of numeral-8 that extends in the fore-and-aft direction of the vehicle, and a pair of dips in directivity that are formed on the two sides of the vehicle is made up for by the mono-pole antenna function provided by the two open pins 16a and 16b. Therefore, the keyless entry system antenna 9 can be made substantially free from directivity so that the keyless entry system may be capable of responding to a vehicle operator approaching from any direction. Each vertical pin 14, 15a, 15b, 16a, 16b extends from the bottom wall 6B along the inner surface of the vertical peripheral wall of the inner box 6 at such a length as to tune with the frequency of the signal to be received.

The tips of the terminals 10 connected to the coil 5 (immobilizer system antenna), tips of the power feed pin 14 and short-circuit pins 15a, 15b of the keyless entry system antenna 9 and tips of the connector pins 12 are fit into openings of the circuit board 8 and soldered to appropriate land portions formed on the printed circuit board 8 during the assembling process. Thereby, the printed circuit board 8 can be firmly secured in the housing while keeping the antenna adequately spaced from other components mounted on the printed circuit board 8.

The ornamental cover 3 having the coil 5 (immobilizer system antenna) insert molded therein is integrally connected to the front wall 6F of the inner box that receives the printed circuit board 8 and keyless entry system antenna 9 so that the two antennas 5 and 9 can be spaced away from each other so as not to interfere with each other.

The ornamental cover 3 and inner box 6 may be injection molded from plastic material having a high mechanical strength such as polybutylene terephthalate, and suitable points of the ornamental cover 3 and inner box 6 are attached to the key device 1 with threaded bolts. If fiber reinforcement material such as glass fiber is included in the plastic material for the ornamental cover 3 and inner box 6, the dielectric material is disposed in parallel with the conductor of the antenna, and this provides a benefit of shifting the resonant frequency of the antenna to a higher range.

Figure 3:
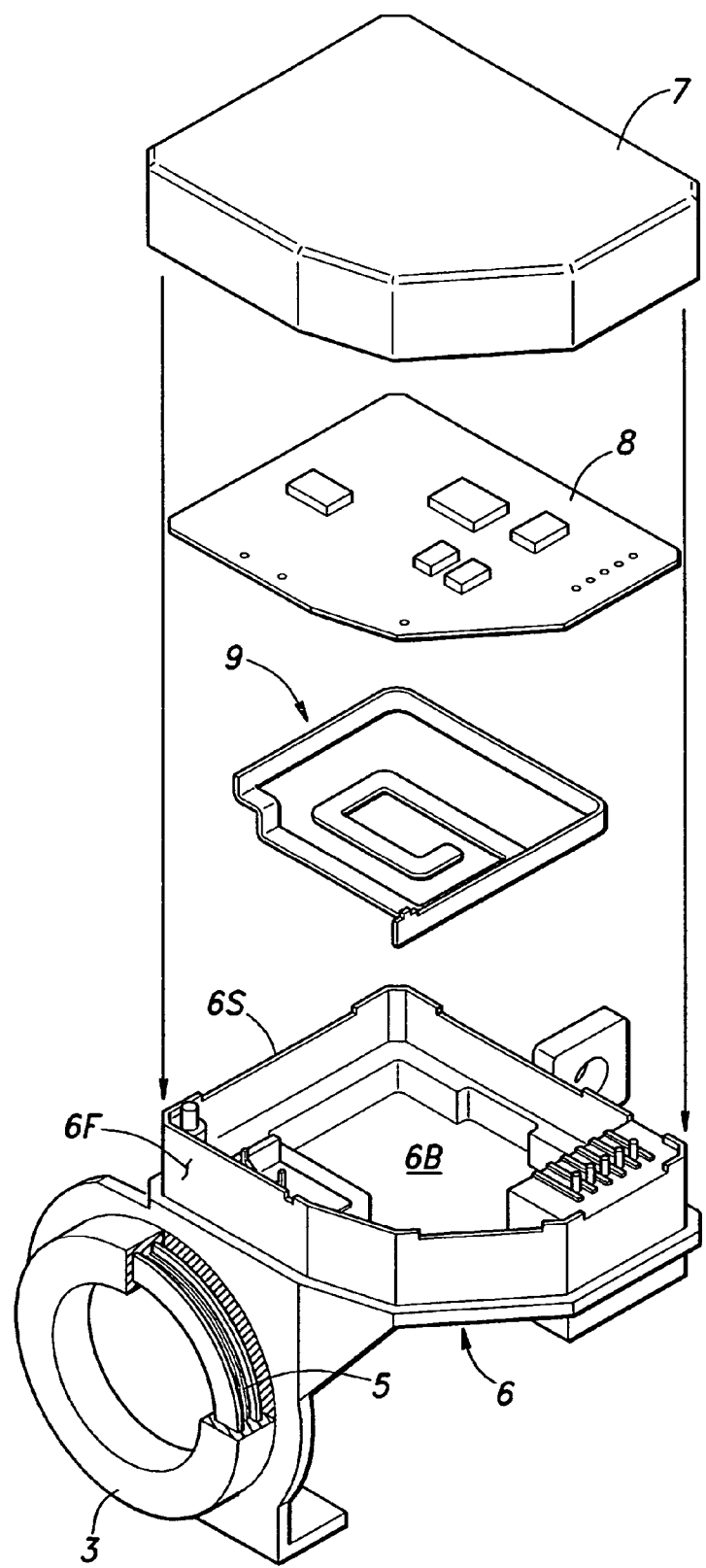
FIG. 3 is an exploded perspective view of a second embodiment of the present invention.

The keyless entry system antenna 9 may also consist of a mono pole antenna having a spiral configuration as illustrated in FIG. 3, instead of the inverted F antenna. In this case, by extending the conductor of the antenna along the side wall 6S of the inner box 6 as well as along the bottom wall 6B, the length thereof can be maximized for the given size of the inner box 6. The width of the metallic part of the antenna may be selected freely according to the required sensitivity. In particular, the broad side of the strip of metal that forms the keyless entry system antenna 9 extends in parallel with the bottom wall 6B in a section thereof, and in parallel with the side wall 6S in the remaining section thereof in this embodiment as well as in the previous embodiment.

Although the present invention has been described in terms of preferred embodiments thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. A vehicle anti-theft system including an immobilizer system and a keyless entry system provided adjacent to a key cylinder, said anti-theft system comprising:
an annular member mounted around a key opening of the key cylinder;
a housing integrally connected to the annular member and retaining a printed circuit board containing circuitry for both the immobilizer system and keyless entry system;
an immobilizer system antenna incorporated in and extending around the annular member and connected to an electric circuit in the printed circuit board; and
a keyless entry system antenna provided in the housing and connected to an electric circuit in the printed circuit board;
wherein the housing is mounted on the key cylinder and includes a bottom wall extending along a side of the key cylinder, and a portion of the keyless entry system antenna extends in parallel with the bottom wall
and wherein the immobilizer system antenna and the position keyless entry system antenna are spaced apart from one another and are arranged in a non-parallel configuration;
wherein the housing further includes a side wall extending perpendicularly from the bottom wall;
wherein the keyless entry system antenna includes a portion extending in parallel with the side wall.

2. A vehicle anti-theft system according to claim 1, wherein the immobilizer system antenna is insert molded in the annular member.

3. A vehicle anti-theft system according to claim 1, wherein the keyless entry system antenna is insert molded in the bottom wall of the housing.

4. A vehicle anti-theft system according to claim 1, wherein the keyless entry system antenna is mounted on the printed circuit board.

5. A vehicle anti-theft system according to claim 1, wherein the keyless entry system antenna is made of stamp formed sheet metal.

6. A vehicle anti-theft system according to claim 1, wherein the housing consists of injection molded plastic material containing glass fibers.

7. A vehicle anti-theft system according to claim 1, wherein a cover wall of the key cylinder extends downwardly from the bottom wall of the housing and perpendicularly thereto, and the annular member and the immobilizer system antenna are supported on the key cylinder cover wall.

8. A vehicle anti-theft system according to claim 1, wherein the bottom wall of the housing is substantially planar.

9. A vehicle anti-theft system according to claim 1, wherein the housing includes an inner portion which is integrally connected to the annular member, and an outer portion which covers the inner portion to define an enclosed space therebetween.

10. A vehicle anti-theft system according to claim 1, wherein the key cylinder is disposed beneath the housing.

11. A vehicle anti-theft system according to claim 1, wherein the keyless entry system antenna includes a main portion which is substantially planar and extends in parallel with the bottom wall of the housing.

12. A vehicle anti-theft system according to claim 1, wherein the keyless entry system antenna includes a main portion which is substantially planar and molded into the bottom wall of the housing.

13. The vehicle anti-theft system according to claim 1, wherein the keyless entry system antenna and the immobilizer system antenna are both insert molded into a single unitary molding comprising a base portion of the housing and the annular member, so as to fix a spatial relationship therebetween.

14. The vehicle anti-theft system according to claim 1, wherein the immobilizer system antenna and a portion of the keyless entry system antenna are oriented substantially perpendicular to one another.

15. The vehicle anti-theft system according to claim 1, wherein the immobilizer system antenna is substantially annular in shape, and a main portion of the keyless entry system antenna extends in a substantially rectangular loop.

16. The vehicle anti-theft system according to claim 1, wherein the annular member is oriented substantially perpendicular to the bottom wall of the housing.

17. A vehicle anti-theft system including an immobilizer system and a keyless entry system provided for placement adjacent to a key cylinder in an installed configuration thereof, said anti-theft system comprising:

an annular member having a key insertion opening formed therein;

a housing base portion integrally connected to the annular member and having a generally flattened bottom wall;

a printed circuit board disposed in the housing base portion and having circuitry thereon for both the immobilizer system and the keyless entry system;

an immobilizer system antenna disposed in and extending around the annular member and connected to an electric circuit in the printed circuit board; and a keyless entry system antenna provided in the housing base portion and connected to an electric circuit in the printed circuit board, wherein a portion of the keyless entry system antenna extends in parallel with the bottom wall;

wherein the housing base portion is mounted on the key cylinder and includes a bottom wall extending along a side of the key cylinder, and a portion of the keyless entry system antenna extends in parallel with the bottom wall and wherein the immobilizer system antenna and the portion of the keyless entry system antenna are spaced apart from one another and are arranged in a substantially perpendicular configuration;

wherein the housing further includes a side wall extending perpendicularly from the bottom wall;

wherein the keyless entry system antenna includes a portion extending in parallel with the side wall.

18. The vehicle anti-theft system according to claim 17, wherein the keyless entry system antenna and the immobilizer system antenna are both insert molded into a single unitary molding comprising a base portion of the housing and the annular member, so as to fix a spatial relationship therebetween.

19. The vehicle anti-theft system according to claim 17, wherein the immobilizer system antenna is substantially annular in shape, and a main portion of the keyless entry system antenna extends in a substantially rectangular loop.

* * * * *